United States Patent
Ahmed et al.

(10) Patent No.: US 7,917,907 B2
(45) Date of Patent: Mar. 29, 2011

(54) METHOD AND SYSTEM FOR VARIABLE THREAD ALLOCATION AND SWITCHING IN A MULTITHREADED PROCESSOR

(75) Inventors: Muhammad Ahmed, Austin, TX (US); Sujat Jamil, Austin, TX (US); Erich Plondke, Austin, TX (US); Lucian Codrescu, Austin, TX (US); William C. Anderson, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1276 days.

(21) Appl. No.: 11/089,474

(22) Filed: Mar. 23, 2005

(65) Prior Publication Data

US 2006/0218559 A1   Sep. 28, 2006

(51) Int. Cl.
*G06F 9/46* (2006.01)
*G06F 15/76* (2006.01)

(52) U.S. Cl. ........ 718/104; 718/100; 718/102; 718/108; 712/34; 712/35

(58) Field of Classification Search .......... 718/101–102, 718/108; 712/34, 35
See application file for complete search history.

(56) References Cited

U.S. PATENT DOCUMENTS

| | | | | |
|---|---|---|---|---|
| 6,018,759 | A * | 1/2000 | Doing et al. ................... | 718/108 |
| 6,052,708 | A * | 4/2000 | Flynn et al. ................... | 718/108 |
| 6,212,544 | B1 * | 4/2001 | Borkenhagen et al. ....... | 718/103 |
| 6,341,347 | B1 | 1/2002 | Joy et al. | |
| 6,567,839 | B1 * | 5/2003 | Borkenhagen et al. ....... | 718/103 |
| 6,697,935 | B1 * | 2/2004 | Borkenhagen et al. ....... | 712/228 |
| 6,714,958 | B1 * | 3/2004 | Tudor ........................... | 718/100 |

(Continued)

FOREIGN PATENT DOCUMENTS

WO     0068780     11/2000

OTHER PUBLICATIONS

Theo Ungerer, Borut Robic, Jurij Silc, "A Survey of Processors with Explicit Multithreading", ACM Computing Survey vol. 35, Mar. 2003, pp. 29-63.*

(Continued)

*Primary Examiner* — Li B Zhen
*Assistant Examiner* — Abdullah Al Kawsar
(74) *Attorney, Agent, or Firm* — Peter M. Kamarchik; Nicholas J. Pauley; Jonathan T. Velasco

(57) ABSTRACT

Techniques for processing transmissions in a communications (e.g., CDMA) system. An aspect of the disclosed subject matter includes a method for processing instructions on a multithreaded processor. The multithreaded processor processes a plurality of threads via a plurality of processor pipelines. The method includes the step determining the operating frequency, F, at which the multithreaded processor operates. Then, the method determines a variable thread switch timeout state for triggering the switching of the processing among the plurality of active threads. The variable thread switch timeout state varies so that each of the plurality of active threads operates at a frequency of an allocated portion of the frequency, F. The allocated portion at which the active threads operate is determined at least in part in order to optimize the operation of the multithreaded processor. The method further switches the processing from a first one of the active threads to a next one of the active threads upon the occurrence of the variable thread switch timeout state.

16 Claims, 6 Drawing Sheets

U.S. PATENT DOCUMENTS

| | | |
|---|---|---|
| 7,013,400 B2 | 3/2006 | Kalla et al. |
| 7,213,134 B2 * | 5/2007 | Soltis et al. ................... 712/229 |
| 2003/0037226 A1 | 2/2003 | Tsuruta et al. |
| 2004/0215984 A1 * | 10/2004 | Kalla et al. ................... 713/300 |
| 2006/0179281 A1 * | 8/2006 | Jensen et al. ................. 712/214 |

OTHER PUBLICATIONS

Ungerer, Theo, "A Survey of Processors with Explicit Multithreading" ACM Computing Surveys, vol. 35, No. 1, Mar. 2003 (29-63).

* cited by examiner

IMT
TS = THREAD SWITCH

METHOD AND SYSTEM FOR VARIABLE THREAD ALLOCATION AND SWITCHING IN A MULTITHREADED PROCESSOR

FIELD

The disclosed subject matter relates to data communication. More particularly, this disclosure relates to a novel and improved method and apparatus for method and system for variable thread allocation and switching in a multithreaded processor.

DESCRIPTION OF THE RELATED ART

A modern day communications system must support a variety of applications. One such communications system is a code division multiple access (CDMA) system that supports voice and data communication between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more standards. One such first generation standard is the "TLA/EIA/IS-95 Terminal-Base Station Compatibility Standard for Dual-Mode Wideband Spread Spectrum Cellular System," hereinafter referred to as the IS-95 standard. The IS-95 CDMA systems are able to transmit voice data and packet data. A newer generation standard that can more efficiently transmit packet data is offered by a consortium named "$3^{rd}$ Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA standard.

Digital signal processors (DSPs) are frequently being used in wireless handsets complying with the above standards. Hardware multithreading is becoming a potentially useful technique in such DSPs. Several multithreaded DSPs have been announced by industry or are already into production in the areas of high-performance microprocessors, media processors, and network processors.

The manifestation of multithreading in a DSP may occur at different levels or at differing degrees of process granularity.

For example, a fine-grained form of multithreading that a DSP may perform uses two or more threads of control in parallel within the processor pipeline. The contexts of two or more threads of control are often stored in separate on-chip register sets. Unused instruction slots, which arise from latencies during the pipelined execution of single-threaded programs by a contemporary microprocessor, are filled by instructions of other threads within a multithreaded processor. The execution units are multiplexed between the thread contexts that are loaded in the register sets.

With wireless handsets using multithreaded DSPs, there is the need to conserve power or, more specifically, energy (i.e., power over time) during their operation. This is because multimedia wireless handsets are and will be consuming increasing amounts of battery or power source energy. For example, a wireless handset providing live television broadcast reception requires the wireless handset to consume battery energy continuously, as opposed to intermittently such as occurs with normal two-way call traffic. The multithreaded DSP for wireless handset operations addresses this concern of efficiently using power sources by processing instructions for as many processor cycles as possible using the present processing architecture. However, problems with existing approaches yet exist.

An important problem to solve in multithreaded DSPs relates to the thread scheduling, i.e., the way in which a DSP determines how to switch processing between threads. Unfortunately, it often occurs that different application mixes may be optimal at different switching intervals. For example, for a DSP with N threads, it may be optimal to switch every cycle. For another DSP with N/2 threads, switching every two cycles may be optimal. In some situations, the same application may be optimal with one switch interval during one part of the application, and a different one during another part. There is a need, therefore, for a method and system that solves a variety of resource use problems associated with thread switching of wireless telecommunications system multithreaded digital signal processing using DSPs and other processors.

Attempts to solve many of these problems have been unsuccessful, due to traditional DSP architectures being set or established for a specific or inflexible application. For example, a user orientation application usually tends to benefit more from certain types of multithreaded operations, whereas scientific applications tend to benefit more from other types of multithreaded operations. As a result, different processors can and have been designed for different applications, but the same processors are not optimal for both applications.

Unfortunately, wireless handsets are requiring and increasingly will require that their DSP process user orientation, scientific, and multimedia applications, as well as many other types of applications for which a single approach to multithreaded operations provides a workable solution. Moreover, the resource requirements may change widely and dynamically for applications such as television broadcasts, streaming message tickers, electronic mail (including messages with attached documents), as well as resident applications, such as photography and PDA applications, all from the same DSP. These applications, of course, may require dynamic allocation and reallocation of processor resources, including variable and dynamic thread scheduling and related management functions. Accordingly, a need exists for a wireless handset multithreaded DSP capable of optimal operations with a wide variety of applications.

SUMMARY

Techniques for variable thread allocation and switching in a multithreaded processor system are disclosed, which techniques improve both the operation of the processor and the efficient use of energy resources for personal computers, personal digital assistants, wireless handsets, and similar electronic devices by assuring that a multithreaded processor processes instructions for a maximal portion of its operational time.

An aspect of the disclosed subject matter includes a method for processing instructions on a multithreaded processor. The multithreaded processor processes a plurality of threads via a plurality of processor pipelines. The method includes the step determining the operating frequency, F, at which the multithreaded processor operates. Then, the method determines a variable thread switch timeout state for triggering the switching of the processing among the plurality of active threads. The variable thread switch timeout state varies so that each of the plurality of active threads operates at a frequency of an allocated portion of the frequency, F. The allocated portion at which the active threads operate is determined at least in part in order to optimize the operation of the multithreaded processor. The method further switches the processing from a first one of the active threads to a next one of the active threads upon the occurrence of the variable thread switch timeout state.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
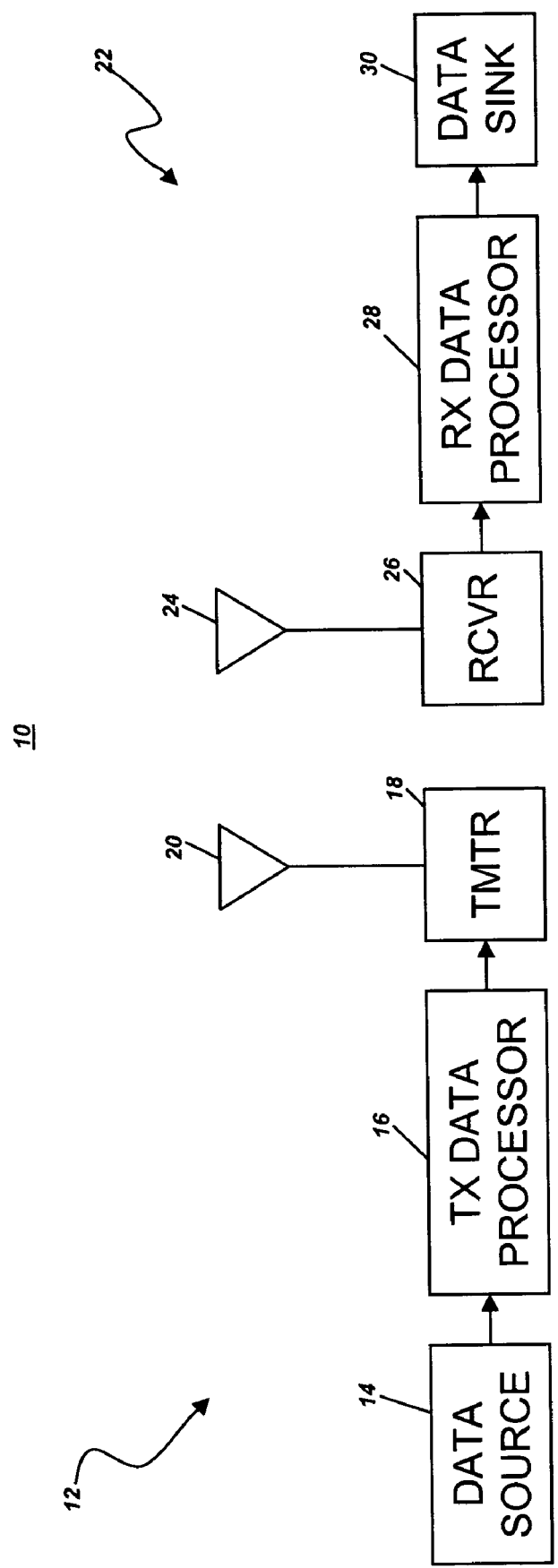
FIG. 1 is a simplified block diagram of a communications system that can implement the present embodiment.

FIG. 1 is a simplified block diagram of a communications system 10 that can implement the presented embodiments. At a transmitter unit 12, data is sent, typically in blocks, from a data source 14 to a transmit (TX) data processor 16 that formats, codes, and processes the data to generate one or more analog signals. The analog signals are then provided to a transmitter (TMTR) 18 that modulates, filters, amplifies, and up converts the baseband signals to generate a modulated signal. The modulated signal is then transmitted via an antenna 20 to one or more receiver units.

At a receiver unit 22, the transmitted signal is received by an antenna 24 and provided to a receiver (RCVR) 26. Within receiver 26, the received signal is amplified, filtered, down converted, demodulated, and digitized to generate in phase (I) and (Q) samples. The samples are then decoded and processed by a receive (RX) data processor 28 to recover the transmitted data. The decoding and processing at receiver unit 22 are performed in a manner complementary to the coding and processing performed at transmitter unit 12. The recovered data is then provided to a data sink 30.

The signal processing described above supports transmissions of voice, video, packet data, messaging, and other types of communication in one direction. A bi-directional communications system supports two-way data transmission. However, the signal processing for the other direction is not shown in FIG. 1 for simplicity.

Communications system 10 can be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA standard.

Figure 2:
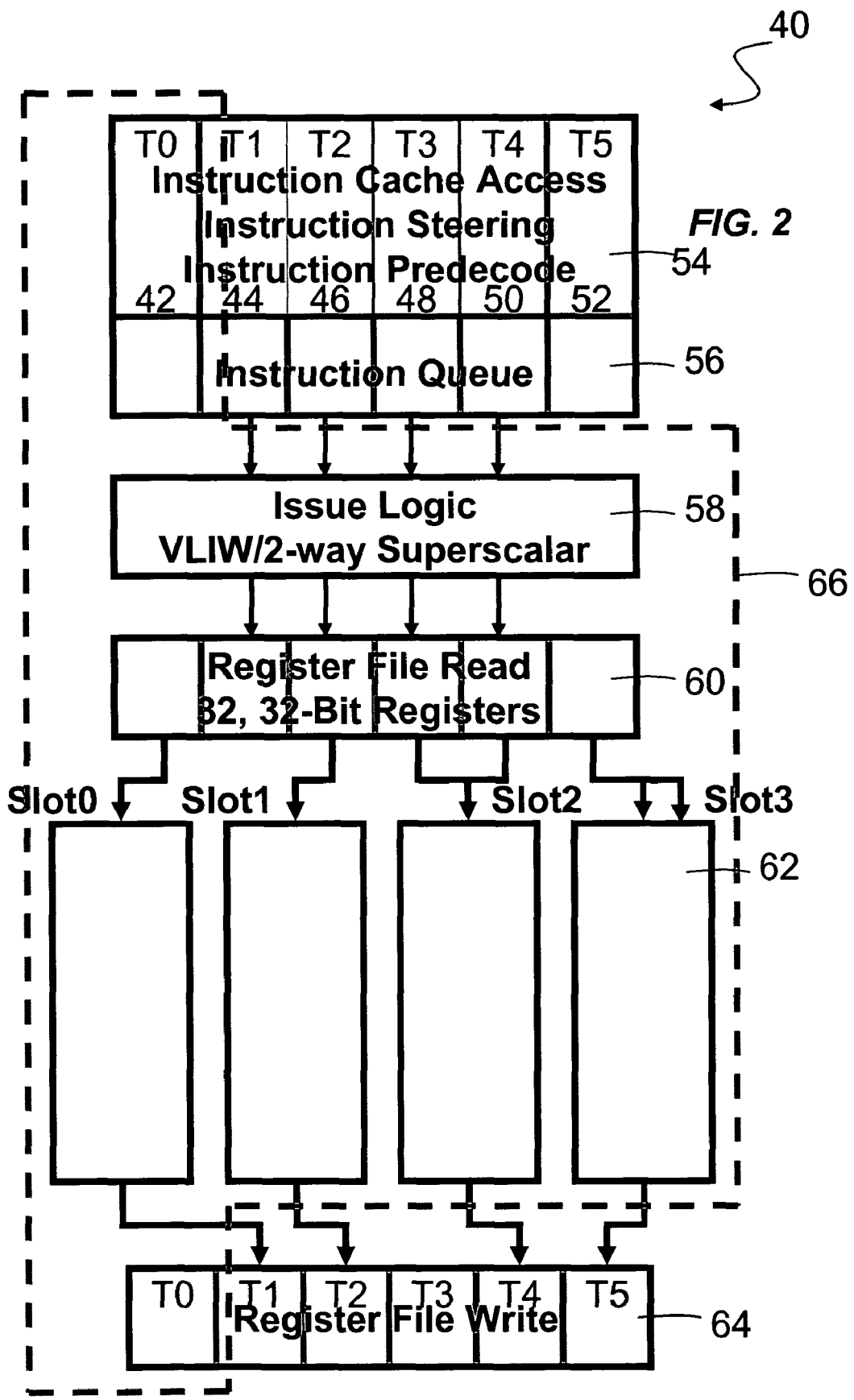
FIG. 2 illustrates a DSP architecture for carrying forth the teachings of the present embodiment.

FIG. 2 illustrates DSP 40 architecture that may serve as the transmit data processor 16 and receive data processor 28 of FIG. 1. Recognize that DSP 40 only represents one embodiment among a great many of possible digital signal processor embodiments that may effectively use the teachings and concepts here presented. In DSP 40, therefore, threads T0 through T5 (reference numerals 42 through 52), contain sets of instructions from different threads. Circuit 54 represents the instruction access mechanism and is used for fetching instructions for threads T0 through T5. Instructions for circuit 54 are queued into instruction queue 56. Instructions in instruction queue 56 are ready to be issued into processor pipeline 66 (see below). From instruction queue 56, a single thread, e.g., thread T0, may be selected by issue logic circuit 58. Register file 60 of selected thread is read and read data is sent to execution data paths 62 for slot0 through slot3. Slot0 through slot3, in this example, provide for the packet grouping combination employed in the present embodiment.

Output from execution data paths 62 goes to register file write circuit 64, also configured to accommodate individual threads T0 through T5, for returning the results from the operations of DSP 40. Thus, the data path from circuit 54 and before to register file write circuit 64 being portioned according to the various threads forms a processing pipeline 66.

The present embodiment may employ a hybrid of a heterogeneous element processor (HEP) system using a single microprocessor with up to six threads, T0 through T5. Processor pipeline 66 has six stages, matching the minimum number of processor cycles necessary to fetch a data item from circuit 54 to registers 60 and 64. DSP 40 concurrently executes instructions of different threads T0 through T5 within a processor pipeline 66. That is, DSP 40 provides six independent program counters, an internal tagging mechanism to distinguish instructions of threads T0 through T5 within processor pipeline 66, and a mechanism that triggers a thread switch. Thread-switch overhead varies from zero to only a few cycles.

Figures 3, 4:
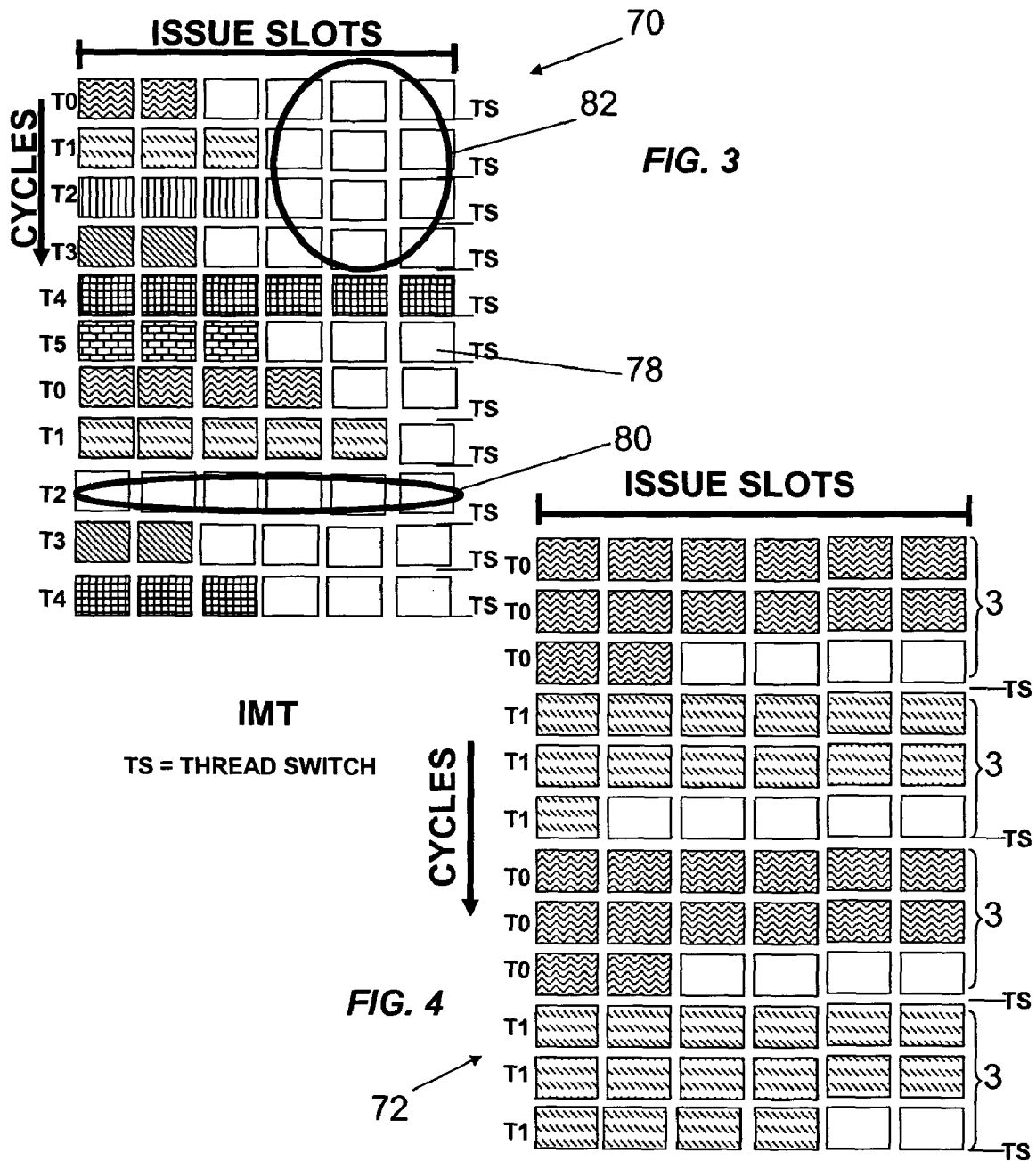
FIGS. 3 through 7 show instruction issue vs. processor cycle diagrams for displaying certain aspects of various embodiments of the claimed subject matter.

FIGS. 3 through 7 show instruction issue vs. processor cycle diagrams for displaying certain aspects of the various embodiments of the present subject matter. In particular, FIG. 3 presents, as a basis, an instruction issue vs. processor cycle diagram 70 for IMT operation of DSP 40.

FIG. 4 shows diagram 72 relating to dynamic thread frequency allocation and switching operations of the present embodiment.

Figure 5:
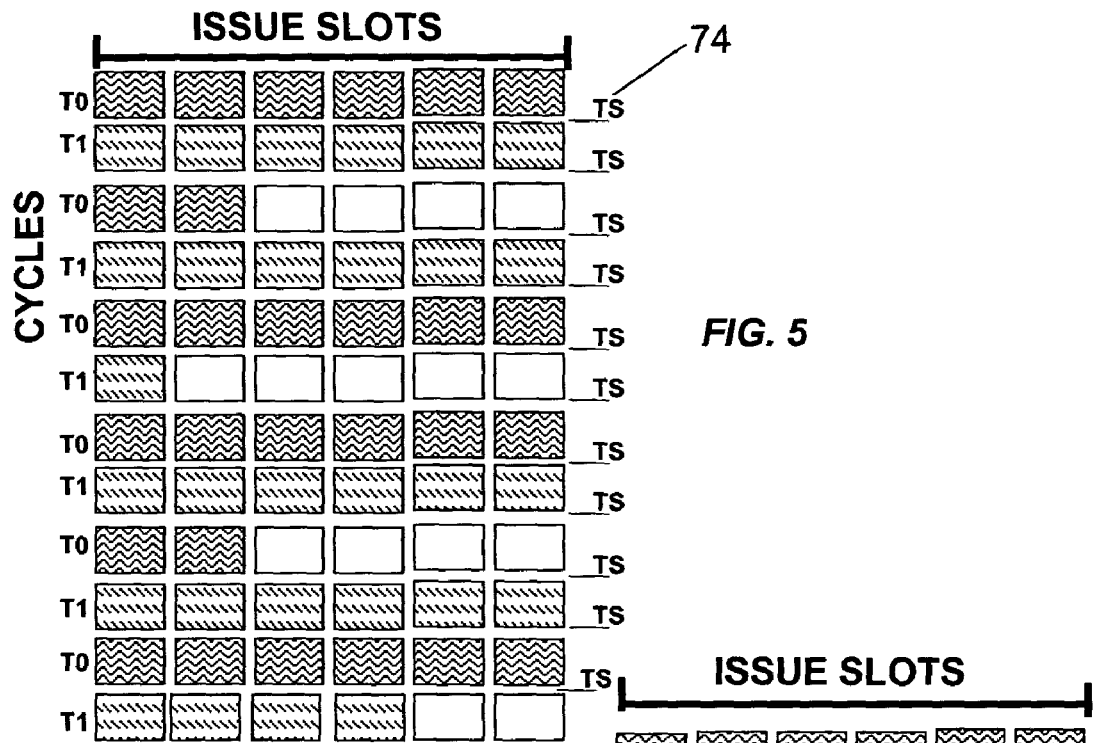

FIG. 5 shows diagram 74 for another embodiment of dynamic thread frequency allocation and switching operation with DSP 40.

Figure 6:
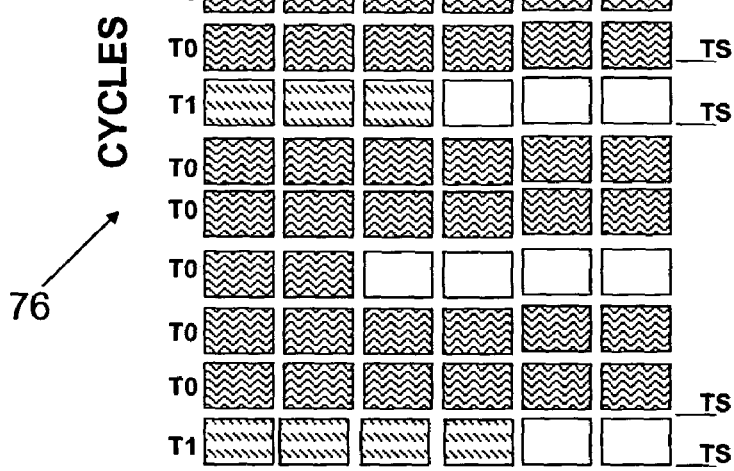

FIG. 6 further presents diagram 76 to show certain quality of service aspects of dynamic thread frequency allocation that the disclosed subject matter makes possible.

Figure 7:
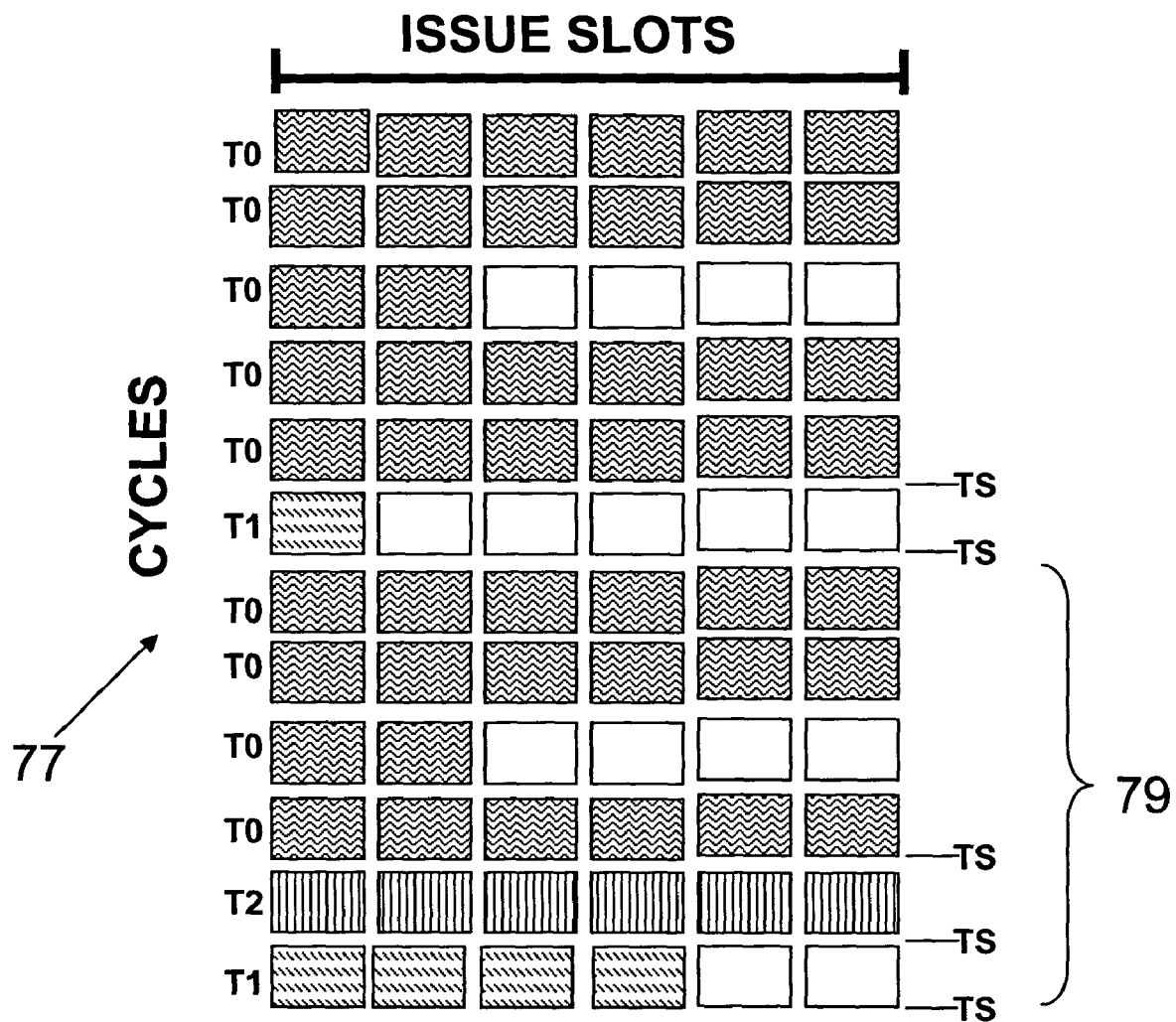

FIG. 7 illustrates how dynamic thread allocation may operate within a disclosed embodiment to accommodate interruptions, such electronic messages.

In all of FIGS. 3 through 7, empty issue slots, such as empty slot 78 (FIG. 3) may be defined as either vertical or horizontal waste. Vertical waste 80 occurs when DSP 40 issues no instructions in a cycle, i.e., there is instruction issue stalling. Horizontal waste 82 occurs when DSP 40 fills only a non-empty subset of the slots available at a given cycle.

As FIG. 3, to establish a baseline for comparison, shows IMT operations where thread switch TS by switching the processed thread at every cycle, regardless of whether a long-latency event occurs. As such, DSP 40 resources are interleaved among a pool of ready threads, T0 through T5, at a single-cycle granularity. If there are N pipeline stages, DSP 40 will use N active threads. In the FIG. 3 example, DSP 40 includes six pipeline stages and 6 active threads. The result is a one-to-one correspondence between the number of pipeline stages and the number of active threads.

FIG. 4 depicts one aspect of the present embodiment for dynamically allocating active threads within DSP 40. The effect is to share the DSP 40 total frequency among only the active threads. For example, consider DSP 40 operating at a frequency of 600 MHz and with only two of the threads, T0 and T1, in the six pipeline stages operating as active threads. Thus, for three clock cycles, sets of instructions from thread T0 are processed by DSP 40. Then, for a next three cycles, DSP 40 processes sets of instructions from thread T1. The present embodiment, therefore, may cause active threads T0 and T1 to operate at a frequency of 300 MHz. Alternatively, in the event that only three of the threads are active, each active thread, e.g., T0:T2, may operate at a frequency of 200 MHz, for example. In fact, the present embodiment may permit a single active thread to operate at a frequency of 600 MHz in a 600 MHz DSP 40.

In addition to allowing active threads to operate at their relative proportion of the total DSP 40 frequency, the present embodiment provides varying switching strategies to achieve such proportions. Thus, in one embodiment, DSP 40 may switch only the active threads on each clock cycle, for example. As an illustration, consider diagram 72 of FIG. 4, wherein the active threads are T0 and T1, then switching may be as T0, T0, T0, T1, T1, T1, . . . , at each clock cycle. With DSP 40 operating at 600 MHz, the active threads T0, and T1, in this example, will see an effective frequency of 300 MHz. Alternatively, switching may be as shown in diagram 74 of FIG. 5, which presents a switching pattern of T0, T1, T0, T1, T0, T1, T0, T1, . . . . Although the switching patterns of FIGS. 4 and 5 differ, each switching pattern achieves an effective frequency of 300 MHz. In this example, note that DSP 40 does not visit threads T2, T3, T4, and T5, which are inactive. The result is an increase in the DSP 40 operating efficiency by only executing sets of instructions from active threads.

As the above examples illustrate, it is possible to program DSP 40 to share the processor overall frequency among only the active threads while using a thread switching pattern that may change according to the various requirements of the application(s) for which DSP 40 operates. The different thread switching patterns may be programmable in the system software operating DSP 40, so that a register or other issue logic controls thread switching. A principal consideration in choosing whether to use one sequence or another is assuring that the chosen sequence appropriately resolves instruction issue dependencies that may arise.

The disclosed subject matter demonstrates a substantial degree of flexibility when the various threads of a multi-threaded processor demand differing amounts of processor resources. Thus, a set of instructions on one thread may require a greater proportion of processor resources than do other sets of instructions on other threads. In such an instance, the present embodiment may allocate processor resources for a significantly larger amount of time to the more demanding thread than is allocated to other threads. This may result in an overall improvement in processor operation.

Now, consider the instance of a user viewing a television broadcast on a wireless handset. Consider further that during such television broadcast viewing the user receives an eMail message that may include an attachment, such as a text document, an image document or even another streaming attachment, such as a streaming greeting card or other active message. Such an interrupting message and attachment will require the use of one or more threads of DSP 40, which will be executing sets of instructions relating to the television broadcast. In other instances, a television broadcast may be accompanied by a scrolling message or information, which message is not part of the television broadcast, but a separate stream of information requiring the use of one or more threads of DSP 40 for displaying the streaming information. Such information may be, for example, real time weather information from a weather information service, flight information from a flight information source, and/or stock market information from a stock market ticker or information service.

In such examples as the above, only two threads, instead of all six threads may be required to provide information to the user. FIG. 6, therefore, shows diagram 76 as a further example that may allocate to a first thread, T0, five of six processor clock cycles for the television broadcast. The streaming information or second thread, in comparison, may be allocated only one of the six processor clock cycles. Such allocation may materially enhance the quality of service that the wireless handset provides. That is, by dedicating a disproportionately large amount of the processor clock cycles to the television broadcast, thread T0 may effectively see a 500 MHz operating frequency. All the while, DSP 40 may allocate a disproportionately smaller amount of processor clock cycles to the streaming information, thread T1, in this example, may see a 100 MHz effective operating frequency. The result becomes that not only does DSP 40 more efficiently operate by executing instructions for a greater portion of processor cycles, but also the user experiences an improved quality of service.

With reference to diagram 77 of FIG. 7, suppose that, in order to provide to the user a full-screen television broadcast, active thread T0 receives five of six clock cycles, while streaming information is executed on active thread T1 during the sixth clock cycle. Suppose further that the wireless receives an electronic message interrupt such as described above. DSP 40 will be limited because all of the active threads consume by existing processing clock cycles. The present embodiment may shrink the television broadcast on the user screen to smaller inserted display, T0 reduce the thread use from five threads to four threads, as section 79 of diagram 77 shows. The one thread T2 may then provide to the user the eMail message with the text document, image document, or streaming greeting card, for example. Therefore, the present embodiment provides dynamic reallocation of threads during wireless handset operation.

Figure 8:
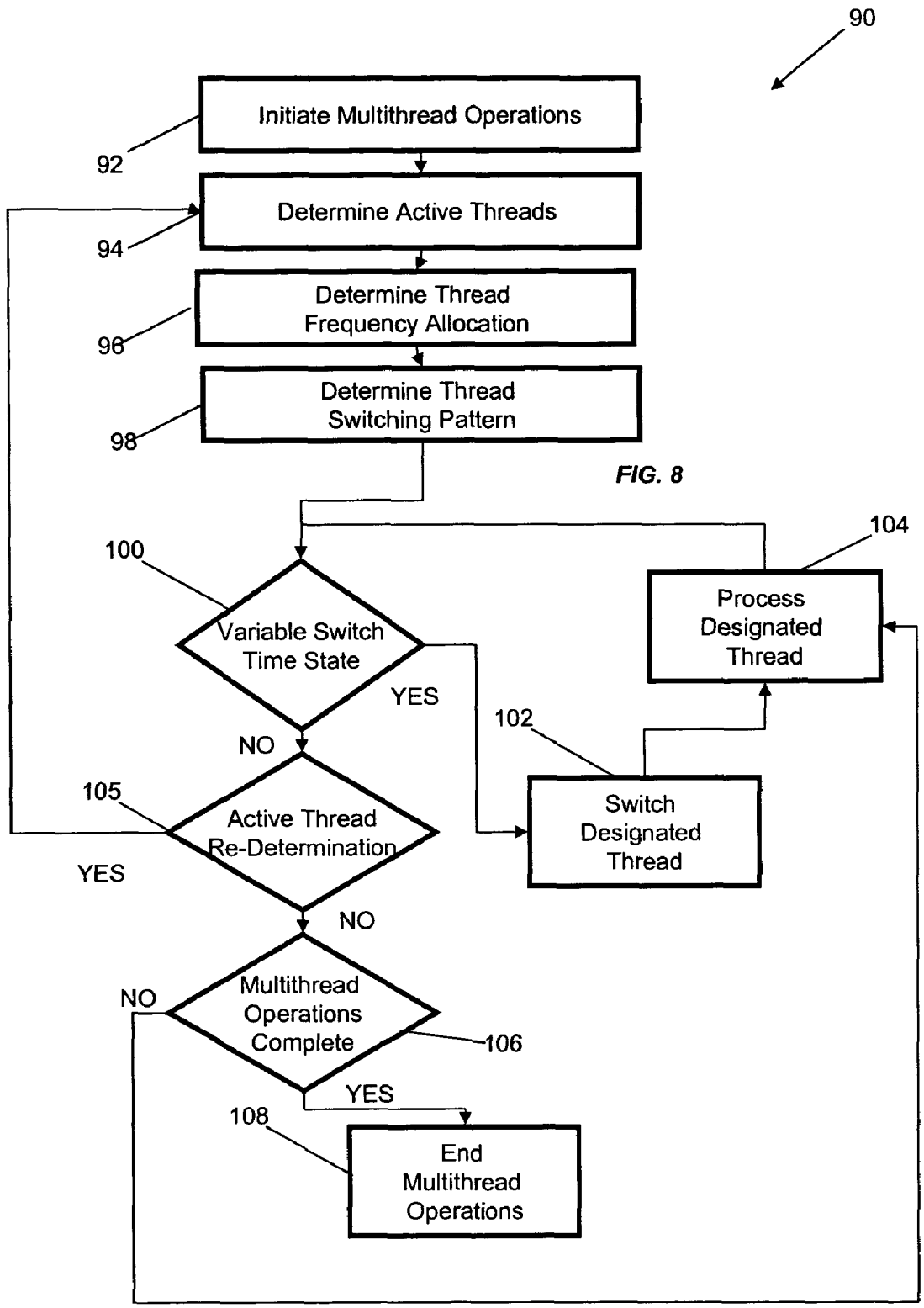
FIG. 8 is a flow diagram depicting an exemplary process flow that may effect one different embodiments of a variable allocation and interval multithreaded processor displaying concepts here disclosed.

FIG. 8 presents flow diagram 90 for depicting an example of the variable and dynamic multithreaded processor method and system of the present embodiment. Referring to FIG. 8, process 90 may be thought of as beginning at step 92, where DSP 40 multithreaded operations initiate. At step 94, process 90 dynamically determines which are the active threads operating on DSP 40. At step 96, process flow 90 dynamically determines a thread frequency allocation so as to optimize the overall performance of DSP 40. Step 98 relates to the dynamically determining a thread switching pattern, such as discussed in connection with FIGS. 4 and 5, above.

While multithreaded operations occur, process 90 tests, at query 100, whether a predetermined number of cycles, i.e., whether variable thread switch timeout state, has been reached for switching. If so, then process flow goes to step 102, at which point DSP 40 switches from processing the first thread to processing a next thread. Then, process flow goes to step 104 for DSP 40 to process the new thread. In process 90, flow returns to query 100, always verifying the occurrence of the variable thread switch timeout state. Now, if the timeout state has not yet been reached, then a test of whether a need exist to re-determine the active threads occurs at query 105. Such a condition may arise in the event of an electronic message to DSP 40, as discussed with FIG. 7, above. If no re-determination is required, then process 90 continues to query 106 for testing whether multithreaded operations are complete. If so, process flow goes to step 108 for terminating multithreaded operations. Otherwise, process flow continues to step 104 for continuing to process the current thread.

In another embodiment of the disclosed subject matter, DSP 40 may be always running a single type of thread. In such an instance, a cache miss may occur. In response, DSP 40 may stop executing forward. Upon such stopping, DSP 40 may be programmed to switch to another thread having identified that a variable switch time state has occurred, as per query 100. The processor may return to the same thread or go a next thread, according to steps 100 and 102. This may be all programmable according to the needs of a specific application or combination of applications operating on the wireless handset.

In addition to the above described features, the present embodiment may combine with the disclosed subject matter of U.S. patent application Ser. No. 11/080,239, now U.S. Patent Publication No. 2006/0206902, entitled "Variable Interleaved Multithreaded Processor Method and System," by the individuals named in this disclosure and assigned to the assignee of subject matter here claimed, which patent application discloses techniques for processing transmissions in a communications (e.g., CDMA) system. In such disclosure, a multithreaded processor processes a plurality of threads operating via a plurality of processor pipelines associated with the multithreaded processor and predetermines a triggering event for the multithreaded processor to switch from a first thread to a second thread. The triggering event is variably and dynamically determined to optimize multithreaded processor performance. The triggering event may be a dynamically determined number of processor cycles, the number being determined to optimize the performance of the multithreaded processor, or a variably and dynamically determined event, such as a cache or instruction miss. By combining with the subject matter here disclosed still further synergies and benefits arise.

The processing features and functions described herein can be implemented in various manners. For example, not only may DSP 40 perform the above-described operations, but also the present embodiments may be implemented in an application specific integrated circuit (ASIC), a microcontroller, a microprocessor, or other electronic circuits designed to perform the functions described herein. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the creative faculty. Thus, the claimed subject matter is not intended to be limited to the embodiments shown herein but is to be accorded the widest scope consistent with the principles and novel features disclosed herein.

What is claimed is:

1. A method for processing instructions on a multithreaded processor, the method comprising:
    determining, by logic of the multithreaded processor, a number of active threads associated with the multithreaded processor;
    allocating, by the logic of the multithreaded processor, a number of cycles for each of the active threads over a plurality of cycles, wherein each of the active threads is associated with an application, wherein the number of cycles allocated to each active thread is based at least in part on requirements of the application associated with each active thread;
    determining, by the logic of the multithreaded processor, a thread switching pattern for the plurality of cycles, wherein the thread switching pattern is based at least in part on the number of cycles allocated for each of the active threads, wherein determining the thread switching pattern comprises determining an order in which each of the active threads will be allocated to each cycle of the plurality of cycles; and
    switching, by the logic of the multithreaded processor, the processing from a first one of the active threads to a next one of the active threads in accordance with the thread switching pattern;
    wherein determining the order in which each of the active threads is to be allocated to each cycle comprises:
        allocating all of the cycles into groups such that each group includes cycles associated with a single active thread, wherein the cycles are ordered by group such that all of the cycles in a group are processed consecutively; or
        alternating cycles associated with the active threads such that at least one active thread has two non-consecutive cycles.

2. The method of claim 1, wherein the same number of cycles are allocated for each of the active threads.

3. The method of claim 1, wherein a first number of cycles allocated for a first active thread is different from a second number of cycles allocated for a second active thread.

4. The method of claim 1, further comprising: determining a revised thread switching pattern during the processing of the active threads in response to introduction of a new active thread not included in the thread switching pattern, wherein the revised thread switching pattern includes the new active thread.

5. The method of claim 1, further comprising switching the processing from the first one of the active threads to the next one of the active threads in response to a cache miss that occurs when executing the first one of the active threads.

6. The method of claim 1, further comprising:
    processing a first active thread for a first set of cycles in accordance with the thread switching pattern; and
    determining whether the processing of the first set of cycles has been completed.

7. The method of claim 6, further comprising:
    determining whether a revised thread switching pattern is needed in response to determining that the processing of the first set of cycles has not been completed.

8. The method of claim 7, further comprising:
    receiving a new active thread; and
    determining a revised thread switching pattern in response to the received new active thread, wherein the revised thread switching pattern includes the new active thread.

9. The method of claim 8, further comprising:
reducing the number of cycles allocated to a first active thread in the revised thread switching pattern compared to the number of cycles allocated to the first active thread in the thread switching pattern.

10. The method of claim 6, further comprising:
processing a second active thread for a second set of cycles in accordance with the thread switching pattern in response to determining that the first set of cycles has been completed.

11. A system for processing instructions on a multithreaded processor, the system comprising:
active thread determining logic for determining a number of active threads associated with the multithreaded processor;
control circuitry for determining a number of cycles allocated to each of the active threads over a plurality of cycles, wherein each of the active threads is associated with an application, wherein the number of cycles allocated to each active thread is based at least in part on requirements of the application associated with each active thread; and
issue logic for determining a thread switching pattern for the plurality of cycles, wherein the thread switching pattern is based at least in part on the number of cycles allocated for each of the active threads, wherein determining the thread switching pattern comprises determining an order in which each of the active threads is to be allocated to each cycle of the plurality of cycles, and the issue logic for switching the processing from a first one of the active threads to a next one of the active threads in accordance with the thread switching pattern;
wherein determining the order in which each of the active threads is to be allocated to each cycle comprises:
allocating all of the cycles into groups such that each group includes cycles associated with a single active thread, wherein the cycles are ordered by group such that all of the cycles in a group are processed consecutively; or
alternating cycles associated with the active threads such that at least one active thread has two non-consecutive cycles.

12. The system of claim 11, wherein the same number of cycles are allocated for each of the active threads.

13. The system of claim 11, wherein a first number of cycles allocated for a first active thread is different from a second number of cycles allocated for a second active thread.

14. The system of claim 11, wherein the issue logic is further configured to determine a revised thread switching pattern during the processing of the active threads in response to an introduction of a new active thread, wherein the revised thread switching pattern includes the new active thread.

15. The system of claim 14, wherein the number of cycles allocated to a first active thread in the revised thread switching pattern is reduced compared to the number of cycles allocated to the first active thread in the thread switching pattern as a result of the introduction of the new active thread, wherein the control circuitry is further configured to modify the requirements of a first application associated with the first active thread in response to the reduced number of cycles allocated to the first active thread.

16. A digital signal processor for processing instructions on a multithreaded processor, wherein the digital signal processor comprises:
logic to determine a number of active threads associated with the multithreaded processor;
logic to allocate a number of cycles for each of the active threads over a plurality of cycles, wherein each of the active threads is associated with an application, wherein the number of cycles allocated to each active thread is based at least in part on requirements of the application associated with each active thread;
logic to determine a thread switching pattern for the plurality of cycles, wherein the thread switching pattern is based at least in part on the number of cycles allocated for each of the active threads, wherein determining the thread switching pattern comprises determining an order in which each of the active threads is to be allocated to each cycle of the plurality of cycles; and
logic to switch the processing from a first one of the active threads to a next one of the active threads in accordance with the thread switching pattern;
wherein determining the order in which each of the active threads is to be allocated to each cycle comprises:
allocating all of the cycles into groups such that each group includes cycles associated with a single active thread, wherein the cycles are ordered by group such that all of the cycles in a group are processed consecutively; or
alternating cycles associated with the active threads such that at least one active thread has two non-consecutive cycles.

* * * * *